US009283901B2

(12) United States Patent
Bemis

(10) Patent No.: US 9,283,901 B2
(45) Date of Patent: Mar. 15, 2016

(54) APPARATUS FOR UNLOADING MATERIAL FROM A TRUCK BED

(71) Applicant: David G. Bemis, Apple Valley, CA (US)

(72) Inventor: David G. Bemis, Apple Valley, CA (US)

(*) Notice: Subject to any disclaimer, the term of this patent is extended or adjusted under 35 U.S.C. 154(b) by 0 days.

(21) Appl. No.: 14/596,042

(22) Filed: Jan. 13, 2015

(65) Prior Publication Data

US 2015/0125256 A1    May 7, 2015

Related U.S. Application Data

(63) Continuation of application No. 13/907,765, filed on May 31, 2013, now Pat. No. 8,955,898.

(60) Provisional application No. 61/689,346, filed on Jun. 4, 2012.

(51) Int. Cl.
    *B62D 33/00*      (2006.01)
    *B60R 13/01*      (2006.01)
    *B60P 1/64*      (2006.01)

(52) U.S. Cl.
    CPC . *B60R 13/01* (2013.01); *B60P 1/64* (2013.01); *B60R 2013/016* (2013.01)

(58) Field of Classification Search
    CPC ............ B60J 7/085; B60J 7/102; B60J 7/062; B60J 7/104; B60P 7/04; B62D 33/0207
    USPC .................. 296/39.2, 100.12, 100.13, 100.14, 296/100.15, 100.16, 100.18, 98, 100.01, 296/105, 100.11, 100.17; 224/404, 542, 224/543
    See application file for complete search history.

(56) References Cited

U.S. PATENT DOCUMENTS

| 2,803,491 | A | | 8/1957 | Brown |
| 4,279,439 | A | | 7/1981 | Cantieri |
| 4,890,874 | A | | 1/1990 | Davis |
| 5,050,924 | A | * | 9/1991 | Hansen ................ B60P 7/0876 296/100.15 |
| 5,184,931 | A | | 2/1993 | Safko |
| 5,573,365 | A | * | 11/1996 | Michalski ............... B60J 7/085 414/416.09 |
| 5,722,710 | A | | 3/1998 | Faciani |
| 5,806,909 | A | | 9/1998 | Wise |
| 6,131,983 | A | * | 10/2000 | Jackson .................. B60R 13/01 296/39.1 |
| 6,386,622 | B1 | * | 5/2002 | Grimm .................. B60R 13/01 296/183.1 |
| 6,474,022 | B1 | * | 11/2002 | Double ...................... B60J 7/10 135/115 |
| 8,292,559 | B1 | * | 10/2012 | Foggy ................... B60P 7/0876 410/96 |
| 8,430,441 | B2 | * | 4/2013 | Waterman ............... B60R 13/01 296/136.01 |
| 8,544,922 | B1 | | 10/2013 | Huzar |
| 8,955,898 | B2 | | 2/2015 | Bemis |
| 9,151,358 | B2 | * | 10/2015 | Dahl ....................... F16G 11/14 |

(Continued)

OTHER PUBLICATIONS

Image of DumperDogg Pickup Dump Insert [Published as early as May 31, 2013].

(Continued)

*Primary Examiner* — Kiran B Patel
(74) *Attorney, Agent, or Firm* — Stetina Brunda Garred & Brucker

(57) ABSTRACT

An improved tarp specifically configured and adapted for transporting cargo in a truck bed, and unloading cargo from the truck bed at a desired location. The tarp includes several foldable flaps or panels which may be used to secure the cargo within the tarp. The tarp may include several loops which may be used for pulling the tarp out of the truck bed and unloading the cargo from the tarp. Also, the tarp may have several strengthening strips which pull the cargo out of the truck bed.

15 Claims, 4 Drawing Sheets

(56) References Cited

U.S. PATENT DOCUMENTS

| | | | |
|---|---|---|---|
| 2003/0107230 A1 | 6/2003 | Keles | |
| 2005/0218682 A1 | 10/2005 | Klotz et al. | |
| 2006/0170237 A1* | 8/2006 | McAuliffe, Jr. | B60R 13/011 296/39.1 |
| 2006/0273615 A1* | 12/2006 | Ricks, Jr. | B60P 7/0876 296/100.16 |
| 2007/0194589 A1* | 8/2007 | Aliev | B60R 11/00 296/39.1 |
| 2012/0068493 A1 | 3/2012 | Waterman | |
| 2012/0076608 A1* | 3/2012 | Browne | B60J 7/104 410/96 |
| 2012/0082402 A1* | 4/2012 | Martin | B65D 88/16 383/42 |
| 2015/0147519 A1* | 5/2015 | Siegel | B60J 7/10 428/99 |
| 2015/0239388 A1* | 8/2015 | Potter | B60P 7/04 296/100.12 |

OTHER PUBLICATIONS

Images of wooden Pickup Dump Insert [Published as early as May 31, 2013].

Image of Dodge Ram Dump Truck [Published as early as May 31, 2013].

* cited by examiner

APPARATUS FOR UNLOADING MATERIAL FROM A TRUCK BED

CROSS-REFERENCE TO RELATED APPLICATIONS

The present application is a continuation patent application of U.S. patent application Ser. No. 13/907,765, filed on May 31, 2013 which claims the benefit of U.S. Provisional Patent Application No. 61/689,346 filed on Jun. 4, 2012, the entire contents of which are incorporated herein by reference.

STATEMENT RE: FEDERALLY SPONSORED RESEARCH/DEVELOPMENT

Not Applicable

BACKGROUND

1. Technical Field

The present disclosure generally relates to a tarp for lining a truck bed, and more specifically to a tarp specifically configured and adapted for securely transporting and unloading cargo from the truck bed.

2. Related Art

It is well known in the art to transport cargo in truck beds. Cargo may be dirt or other items which does not require delicate handling. Conventional loading of cargo into the truck bed typically entails placing cargo directly in truck bed for transport to the final destination (i.e., a dump, junkyard, scrapyard, landfill, worksite, unloading zone, etc.). At the final destination, the cargo was unloaded, typically by shovel.

Although effective, there are several drawback associated with loading cargo directly into truck bed. One drawback is that the cargo may cause damage to truck bed. Furthermore, unloading of the cargo from the truck bed is typically very labor intensive, and may require multiple individuals. In view of these deficiencies, truck bed liners have been developed to protect the truck bed when transporting cargo. Conventional truck beds are typically fabricated from a protective material (e.g., plastic or rubber) and generally cover the inside of the truck bed. Although protective, there is a cost associated with owning a truck bed liner, and the truck bed liner typically does not assist in removing the cargo from the truck bed.

Tarpaulins (i.e., "tarps") are well known in the art and have also been used for transporting cargo in a truck bed. In some instances, the tarp may be used to simply cover the cargo disposed in the truck bed to prevent inadvertent loss of cargo during transport.

Accordingly, there is a need in the art for an improved method and apparatus for use in a truck bed to facilitate transport of cargo in the truck bed, as well as dumping or removal of the cargo from the truck bed at a desired location. Various aspects of the present invention address this need, as will be discussed in more detail below.

BRIEF SUMMARY

According to an aspect of the invention, there is provided an improved tarp specifically configured and adapted for transporting cargo in a truck bed, and unloading cargo from the truck bed at a desired location. The tarp includes several foldable flaps or panels which may be used to secure the cargo within the tarp. The tarp may include several strengthening straps which include loops used for pulling the tarp out of the truck bed and unloading the cargo from the truck bed.

According to one embodiment, the transport tarp includes a tarp body having a first surface and an opposed second surface. The tarp body includes a main panel and a plurality of peripheral panels coupled to the main panel and selectively foldable relative to the main panel between an open position and a closed position. The plurality of peripheral panels are folded from the open position to the closed position to define an enclosure. A plurality of elongate strengthening strips are coupled to tarp body in spaced relation to each other, wherein each strengthening strip includes a fixed segment extending along the second surface of the main panel and a looped segment defining a loop opening. The loop openings are generally aligned along a common axis.

The transport tarp may be configured such that the main panel defines a generally quadrangular periphery, and the plurality of peripheral panels include a first panel, a second panel, a third panel, and a fourth panel attached to respective peripheral portions of the main panel. The transport tarp may further include a first panel attachment element coupled to the first panel, a pair of second panel attachment elements coupled to the second panel in spaced relation to each other, and a third panel attachment element coupled to the third panel. The first and third panel attachment elements may be cooperatively engageable with respective ones of the pair of second panel attachment elements for connecting the first and third panels to the second panel. The first panel attachment element and one of the pair of second panel attachment elements may be formed from complimentary hook and loop fastening material. The third panel attachment element and the other one of the pair of second panel attachment elements may be formed from complimentary hook and loop fastening material.

The main panel may define a longitudinal axis, and the plurality of elongate strengthening strips may extend in a direction substantially parallel to the longitudinal axis. The plurality of looped segments may be coaxially aligned along an axis substantially perpendicular to the longitudinal axis, and are positioned adjacent one of the plurality of peripheral panels.

The tarp body may be sized to substantially cover a truck bed having a floor, an end wall, a pair of sidewalls, and a tailgate when the tarp body is in the open position. The main panel may define a size complimentary to the floor. When the tarp body is in the open position the first panel may be sized to extend over one of the sidewalls, the second panel may be sized to extend over the end wall, the third panel may be sized to extend over one of the sidewalls, and the fourth panel may be sized to extend over the tailgate.

According to another aspect of the present invention, there is provided a method of transporting and unloading contents from a truck having a truck bed including an inner portion and an outer portion adjacent a tailgate. The method includes providing a transport tarp, placing the transport tarp in the truck bed in the open position, and loading contents into the transport tarp. The transport tarp is then transitioned to the closed position and is secured in the closed position using the looped segments.

The transport tarp may be unloaded from the truck bed by pulling on the looped segments. The tarp body may be configured such that the pulling step causes the tarp body to transition from the closed position to the open position. The pulling step may cause the transport tarp to bend and invert as it is unloaded from the truck bed.

The securing step may include connecting adjacent ones of the peripheral panels together. Hook and loop fasteners may be used to connect adjacent ones of the peripheral panels together. The pulling step may cause the hook and loop fasteners to become disengaged.

The placing step may include placing the transport tarp in the truck bed such that the loop segments are disposed adjacent the inner portion of the truck bed. The placing step may further include placing respective ones of the peripheral panels over respective ones of a plurality of truck bed walls when the tarp body is in the open position.

The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiments of the invention, and is not intended to represent the only form in which the present devices may be developed or utilized. It is to be understood, however, that the same or equivalent functions may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
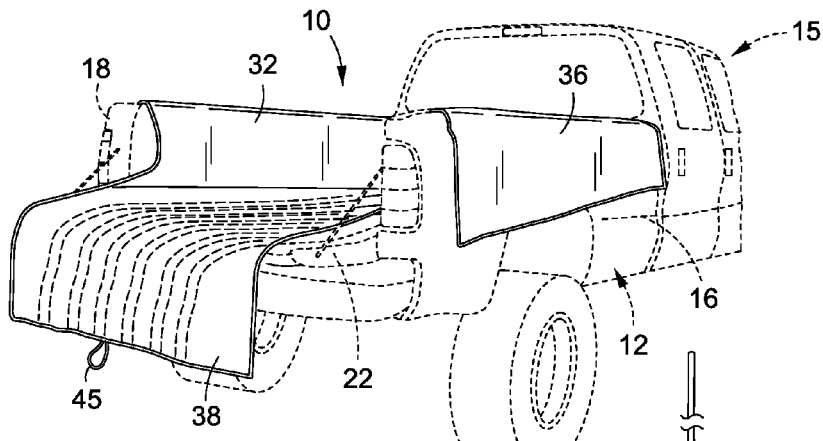
FIG. 1 is perspective view of a tarp constructed in accordance with an embodiment of the present invention and placed in a truck bed of a truck shown in phantom, the tarp being in the open position.

Referring now to the drawings, wherein the showings are for purposes of illustrating a preferred embodiment of the present invention only, and are not for purposes of limiting the same, there is depicted a uniquely configured tarp 10 for use in transporting cargo (e.g., trash, dirt, debris, etc.) in a truck bed 12 (see FIG. 1, depicted in phantom). The tarp 10 includes a main panel and several foldable flaps/panels which are securable in a closed position to maintain the cargo within the tarp 10 during transport. The tarp 10 additionally includes several loops 14 (see FIGS. 2-3) which may be used to easily remove the tarp 10 from the truck bed 12. As will be described in more detail below, the tarp 10 is specifically configured such that when the loops 14 are pulled during removal of the tarp 10 from the truck bed 12, the tarp 10 inverts, which in turn causes unloading of the cargo from the tarp 10.

As used herein, the term "truck bed" 12 generally refers to the cargo area in a vehicle 15 (see FIG. 1). In most vehicles 15, and in particular, pickup trucks, the truck bed 12 is in the rear of the vehicle 15 and is typically integrated into the vehicle 15. Most truck beds 12 include a pair of opposed sidewalls 16, 18 (see FIG. 1), an end wall 20 (see FIGS. 5-7 and 8), and a tailgate 22 (see FIG. 1) opposite the end wall 20. The truck bed 12 defines an inner portion 17 (see FIG. 6) adjacent the end wall 20 and an outer portion 19 (see FIG. 6) adjacent the tailgate 22. Although the exemplary embodiment shows the truck bed 12 as an integral part of pickup truck 15, it is contemplated that the term truck bed 12 may be broad enough to encompass trailers or other vehicle attachable cargo transport devices.

Figure 2:
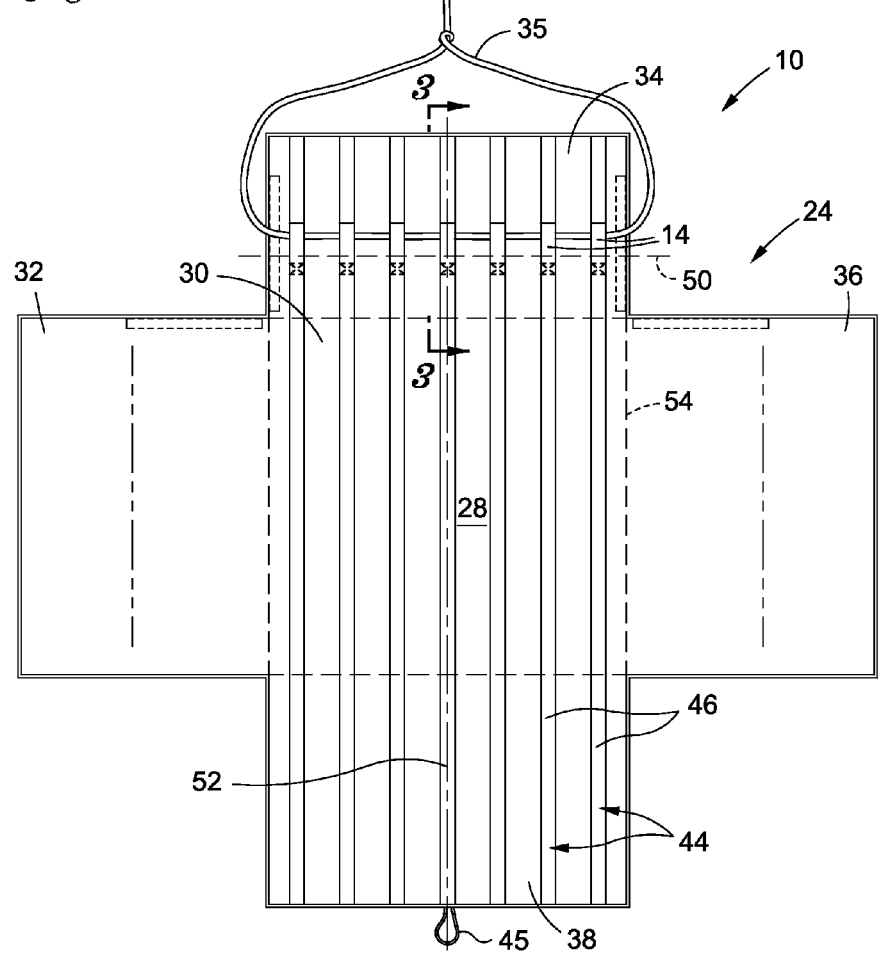
FIG. 2 is a bottom view of the tarp in the open position.
Figure 3:
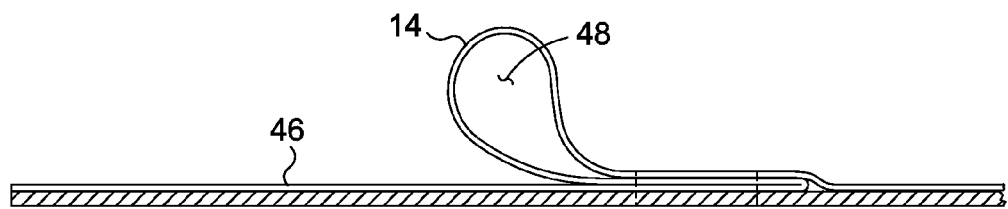
FIG. 3 is a partial side sectional view of the tarp depicted in FIG. 2.

According to one embodiment, the transport tarp 10 includes a tarp body 24 (see FIGS. 2 and 4) having a top surface 26 (i.e., a first surface) (see FIG. 4) and an opposed bottom surface 28 (i.e., a second surface) (see FIG. 2). The tarp body 24 includes a main panel 30 and a plurality of peripheral panels 32, 34, 36, 38 coupled to the main panel 30 and selectively foldable relative to the main panel 30 between an open position and a closed position. The tarp body 24 is shown in the open position in FIGS. 1-3 and 5, and in the closed position in FIG. 6. The tarp body 24 is placed in the open position to load the cargo, and is subsequently transitioned to the closed position to define an enclosure 40 (see FIG. 6) for storing cargo 42 (see FIGS. 5-7).

The tarp body 24 may be sized to substantially cover the floor 25 (see FIG. 6) of the truck bed 12, the end wall 20, the pair of sidewalls 16, 18, and the tailgate 22 when the tarp body 24 is in the open position. The main panel 30 may define a size that is substantially complimentary to the floor 25 so as to cover the floor 25 when the tarp 10 is placed in the truck bed 12. Furthermore, the first panel 32 is sized to extend over one of the sidewalls 18, the second panel 34 is sized to extend over the end wall 20, the third panel 36 is sized to extend over one of the sidewalls 16, and the fourth panel 38 is sized to extend over the tailgate 22 when the tarp body 24 is in the open position. The transport tarp 10 shown in the Figures is configured such that the main panel 30 defines a generally quadrangular periphery 54 (see FIG. 2), and the first panel 32, second panel 34, third panel 36, and a fourth panel 38 are attached to respective peripheral portions of the main panel 30.

The tarp body 24 is preferably formed from a strong, flexible, water-resistant material, such as canvas or polyester coated with urethane, a plastic material such as polyethylene, or from other materials known by those skilled in the art.

In one particular implementation of the present invention, and referring now specifically to FIG. 2, the transport tarp 10 includes a plurality of elongate strengthening strips 44 coupled to tarp body 24 in spaced relation to each other for enhancing the strength and durability of the tarp 10. Each strengthening strip 44 is preferably fabricated from a woven fabric and includes a fixed segment 46 extending along the second surface 28 of the main panel 30 and a looped segment 14 defining a loop opening 48 (see FIG. 3). The looped segments 14 are preferably positioned immediately adjacent the tarp body 24 to mitigate tearing of the strengthening strips 44 from the tarp body 24 when a load is applied to the looped segments 14, as will be described in more detail below. The loop openings 48 are generally aligned along a common axis 50 to facilitate passage of a rope 35 (see FIG. 3) through the loop openings 48 to secure the tarp 10 in the closed position and to remove the tarp 10 from the truck bed 12. An auxiliary loop member 45 is connected to fourth peripheral panel 38 and is configured to be used with the plurality of loop segments 14.

In the exemplary embodiment, the strengthening strips 44 extend along the second panel 34, the main panel 30, and the fourth panel 38, although it is understood that the particular placement of the strengthening strips 44 is exemplary in nature only and is not intended to limit the scope of the present invention. In this regard, other embodiments may include strengthening strips 44 extending over a single panel (e.g., the main panel 30). Furthermore, the exemplary embodiment shows strengthening strips 44 aligned in parallel relation to each other, specifically, the strengthening strips 44 extend in a direction substantially parallel to the longitudinal axis 52 defined by the main panel 30, and the plurality of looped segments 14 are coaxially aligned along an axis 50 substantially perpendicular to the longitudinal axis 52, and are positioned adjacent the second panel 34. Those skilled in the art will readily appreciate that in other embodiments, the strengthening strips 44 may be aligned in an offset or intersecting alignment.

Figure 4:
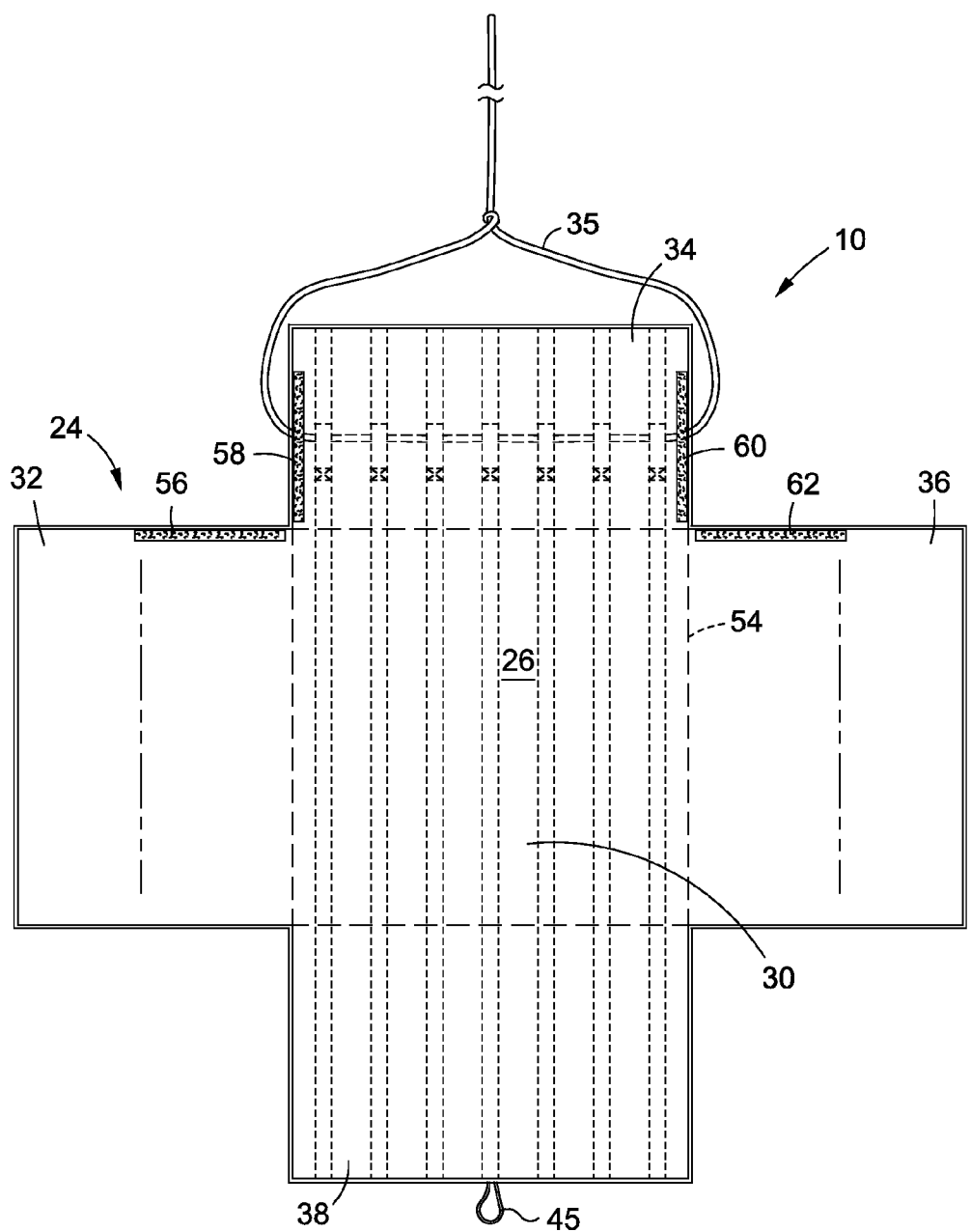
FIG. 4 is a top view of the tarp in the open position.

According to another aspect of the present invention, and referring now specifically to FIG. 4, the transport tarp 10 includes a first panel attachment element 56 coupled to the first panel 32, a pair of second panel attachment elements coupled to the second panel 34 in spaced relation to each other, and a third panel attachment element 62 coupled to the third panel 36. The first panel attachment element 56 is cooperatively engagable with the second panel attachment element 58 to connect the first panel 32 to the second panel 34, and the third panel attachment element 62 is cooperatively engageable with the second panel attachment element 60 for connecting the second and third panels 34, 36 together. According to one embodiment, the attachment elements 56, 58, 60, 62 are formed from complimentary hook and loop fastening material (i.e., VELCRO™), although other attachment mechanisms known in the art may be used, such as buttons, without departing from the spirit and scope of the present invention.

Figure 5:
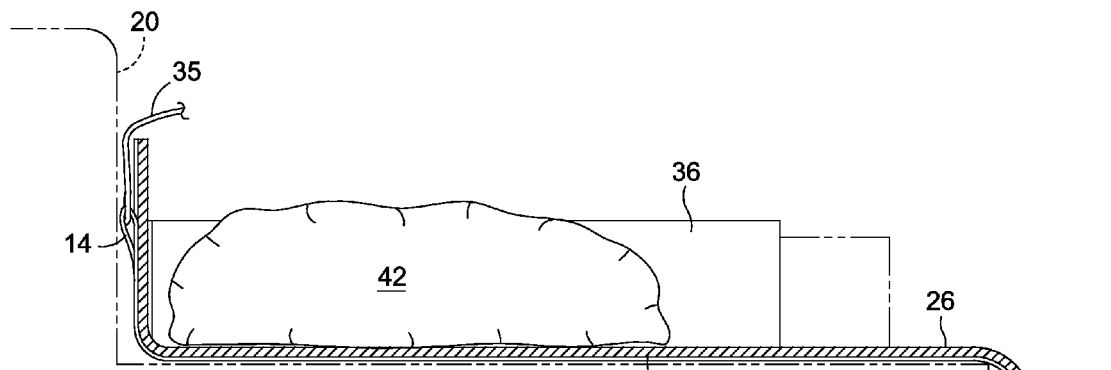
FIG. 5 is a side view of cargo loaded in the tarp and the tarp in the open position.
Figure 6:
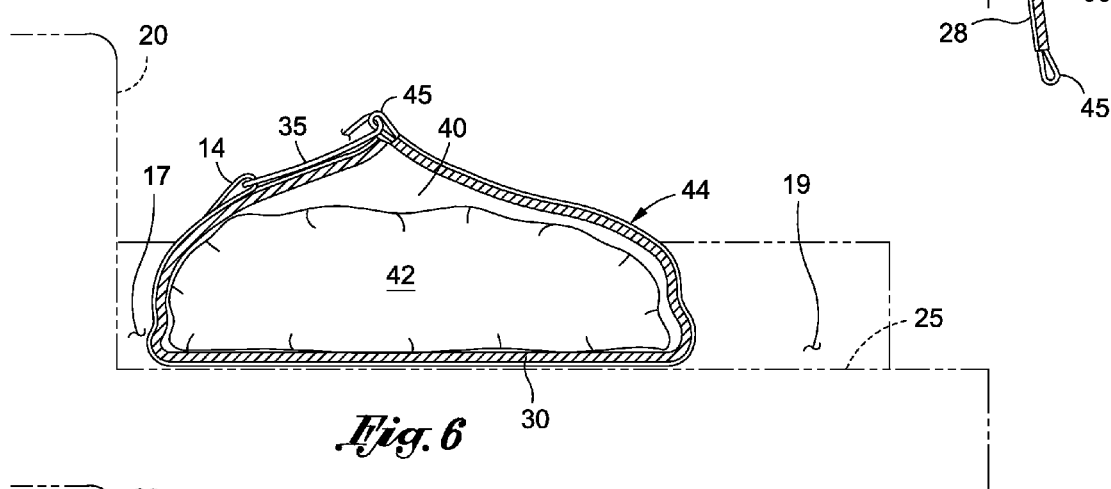
FIG. 6 is a side view of cargo loaded in the tarp and the tarp in a closed position.

With the basic structural features of the invention discussed above, the following discussion will focus on using the tarp 10 to transport and unload contents/cargo 42 from the truck bed 12. The transport tarp 10 is placed in the truck bed 12 in the open position as shown in FIG. 1 and described in more detail above. Also, the first and third panel attachment members 56, 62 engage with respective ones of the second panel attachment members 58, 60. Cargo 42 is loaded into the truck bed 12 by placing the cargo 42 on the main panel 26 of the tarp 10, as shown in FIG. 5. The tarp 10 is then transitioned to the closed position by folding the first and third panels 32, 36 over the cargo 42, and then the second and fourth panels 34, 38 are folded over the first and third panels 32, 36.

A rope 35 is passed through the loop segments 14 formed on the strengthening strips 44 and connected to the second panel 34 as well as through the auxiliary loop member 45 connected to the fourth panel 38. The rope 35 is tightened and secured (e.g., tied) to maintain the tarp 10 in the closed position.

Figure 7:
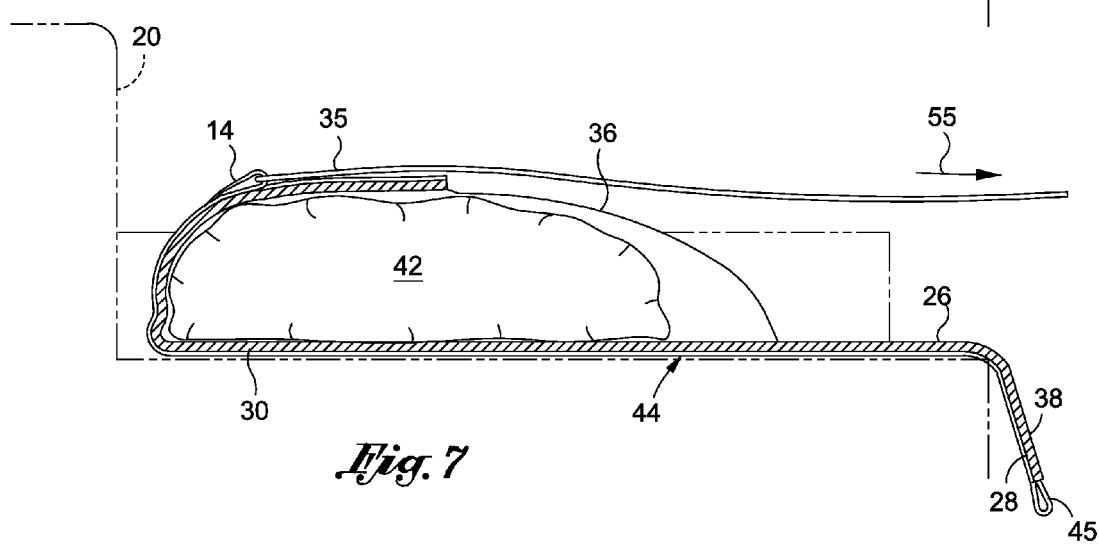
FIG. 7 is a side view of cargo loaded in the tarp and the tarp in a partially open position, the tarp being used to remove the cargo from the truck bed.

To unload the cargo 42 from the truck bed 12, the rope 35 is untied and removed from the auxiliary loop member 45 to allow the fourth panel 38 to be folded downward (e.g., toward the open position) (see FIG. 7). The rope 35 remains within the loop segments 14 to facilitate removal of the tarp 10 from the truck bed 12.

Figure 8:
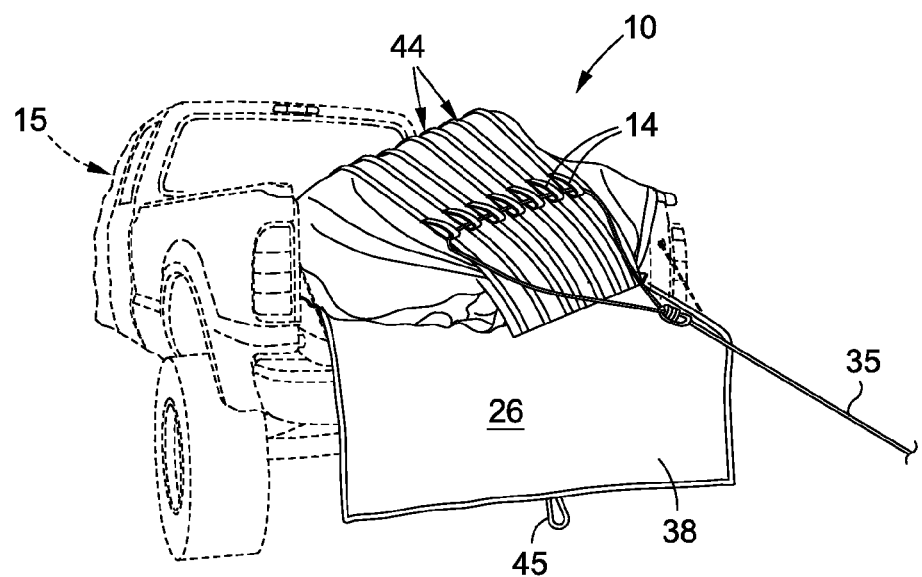
FIG. 8 is a perspective view of the tarp being removed from the truck bed.

The tarp 10 is removed from the truck bed 12 by pulling on the rope 35 in the direction of arrow 55 (see FIG. 7). According to one embodiment, the tarp 10 is inverted as the rope 35 is pulled, which facilitates dumping of the cargo 42 into the unloading area. As shown in FIG. 8, the portion of the tarp 10 disposed adjacent the inner portion of the truck bed 12 is removed first, which causes the inversion of the tarp 10. In other words, pulling on the rope 35 causes the tarp 10 to bend over itself as it is removed from the truck bed 12.

According to one implementation of the present invention, the pulling force additionally causes separation of the first and third panel attachment members 56, 62 from their corresponding second panel attachment members 58, 60. Thus, the tarp body 24 does not tear as the tarp 10 is pulled by the rope 35. Also, the strengthening strips 44 does most of the work to pull the cargo 42 out of the truck bed 12. In this manner, the tarp body 24 may be reused.

Figure 9:
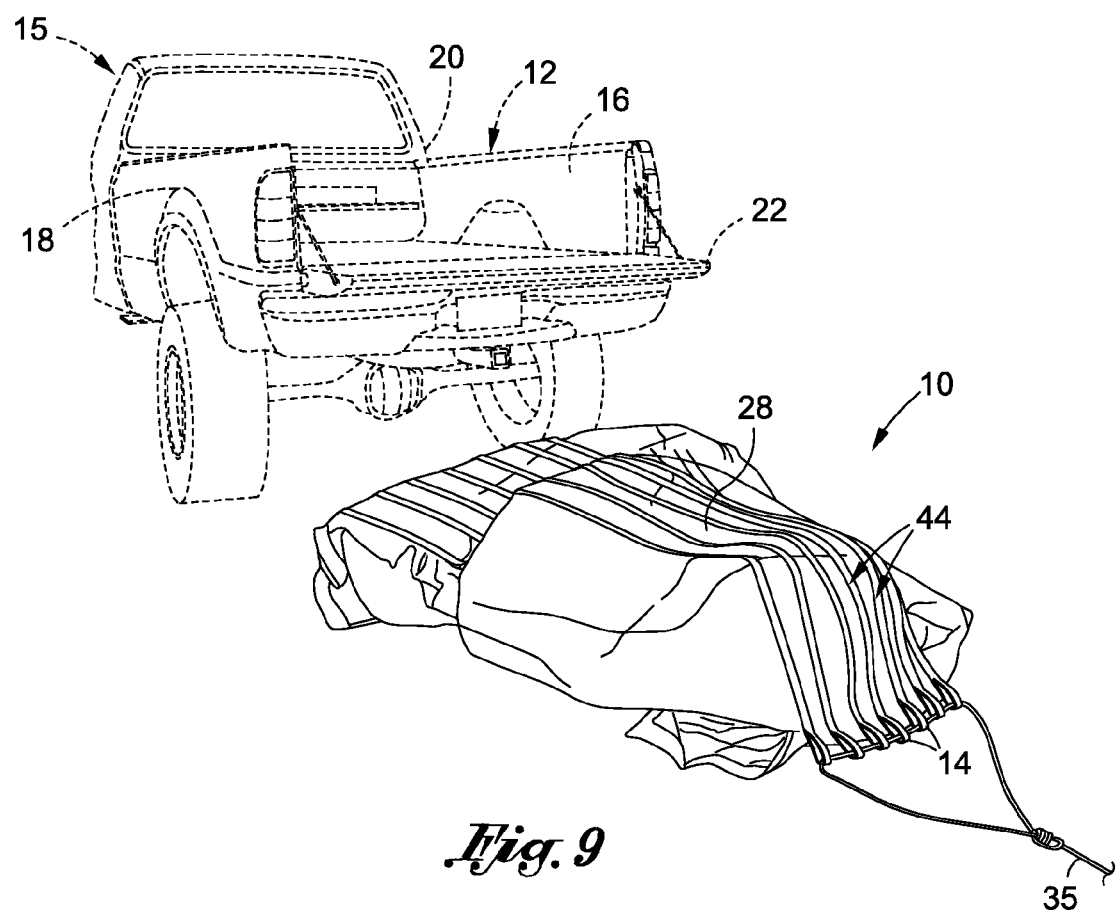
FIG. 9 is a perspective view of the tarp removed from the truck bed and in an inverted position relative to the configuration depicted in FIG. 7.

When the tarp 10 is pulled out of the truck bed 12, the tarp 10 is typically inverted (see FIG. 9) relative to its closed position in the truck bed 12 (see FIG. 6) and the cargo 42 is unloaded in the unloading area. The tarp 10 is removed from the cargo 42 and may be stored for another use.

The particulars shown herein are by way of example and for purposes of illustrative discussion of the embodiments of the present invention only and are presented in the cause of providing what is believed to be the most useful and readily understood description of the principles and conceptual aspects. In this regard, no attempt is made to show more details than is necessary for a fundamental understanding of the disclosure, the description taken with the drawings making apparent to those skilled in the art how the several forms of the presently disclosed invention may be embodied in practice.

What is claimed is:

1. A transport tarp for use with a truck bed, the transport tarp comprising:
    a tarp body having a first surface and an opposed second surface, the tarp body including a main panel and a plurality of peripheral panels coupled to the main panel, the plurality of peripheral panels includes a first panel, a second panel and a third panel attached to respective peripheral portions of the main panel, the main panel defines a longitudinal axis which is aligned to a length of the truck bed when the transport tarp is mounted to the truck bed;
    a plurality of elongate strips coupled to tarp body in spaced relation to each other, the plurality of elongate strips extends in a direction aligned to the longitudinal axis and are permanently attached to the main panel, end portions of the plurality of elongate strips capable of being utilized to pull the transport tarp and objects contained therein off the truck bed.

2. The transport tarp recited in claim 1, further comprising:
    a first panel attachment element coupled to the first panel;
    a pair of second panel attachment elements coupled to the second panel in spaced relation to each other; and
    a third panel attachment element coupled to the third panel;
    the first and third panel attachment elements being cooperatively engageable with respective ones of the pair of second panel attachment elements for connecting the first and third panels to the second panel.

3. The transport tarp recited in claim 2, wherein:
    the first panel attachment element and one of the pair of second panel attachment elements are formed from complimentary hook and loop fastening material; and the third panel attachment element and the other one of the pair of second panel attachment elements are formed from complimentary hook and loop fastening material.

4. The transport tarp recited in claim 1, wherein free distal end portions of the plurality of elongate strips have a plurality of looped segments coaxially aligned along an axis substantially perpendicular to the longitudinal axis, and are positioned adjacent a second panel of the plurality of peripheral panels.

5. The transport tarp recited in claim 1, wherein the tarp body is sized to substantially cover a truck bed having a floor, an end wall, a pair of sidewalls, and a tailgate when the tarp body is in the open position.

6. The transport tarp recited in claim 5, wherein:
the main panel defines a size complimentary to the floor; and
when the tarp body is in the erected position the first panel is sized to extend over one of the sidewalls, the second panel is sized to extend over the end wall, and the third panel is sized to extend over one of the sidewalls.

7. A transport tarp for use with a truck bed, the transport tarp comprising:
a tarp body including a main panel, a first panel, a second panel and a third panel, the first, second and third panels coupled to the main panel;
a plurality of elongate strengthening strips coupled to the tarp body in spaced relation to each other,
a first panel attachment element coupled to the first panel;
a pair of second panel attachment elements coupled left and right sides of the second panel in spaced relation to each other; and
a third panel attachment element coupled to the third panel;
wherein the first and third panel attachment elements are selective detachable with respective ones of the pair of second panel attachment elements for connecting the first and third panels to the second panel in an erected position, the first and third panel attachment elements are attached to respective ones of the pair of second panel attachment elements when loading the transport tarp with objects, and in a rollable configuration, the first and third panel attachments are detached with respective ones of the pair of second panel attachment elements as the transport tarp and objects are being pulled off the truck bed.

8. The transport tarp recited in claim 7, wherein each strengthening strip including a fixed segment extending along and permanently attached to the second surface of the main panel and a lower portion of the second panel and a looped segment extending from the fixed segment defining a loop opening, the loop openings being generally aligned along a common axis.

9. The transport tarp recited in claim , wherein:
the main panel defines a generally quadrangular periphery.

10. A method of transporting and unloading contents from a truck having a truck bed including an inner portion and an outer portion adjacent a tailgate, the method comprising the steps of:
providing a transport tarp comprising:
a tarp body having a first surface and an opposed second surface, the tarp body including a main panel and a plurality of peripheral panels coupled to the main panel; and
a plurality of elongate strips coupled to the tarp body in spaced relation to each other, each strip permanently attached to the second surface of the main panel, the plurality of elongate strips having a looped segment defining a loop opening;
placing the transport tarp in the truck bed in an erected position;
loading objects into the transport tarp; and
pulling on the looped segments to unload the transport tarp from the truck bed wherein the pulling step traverses the panels from the erected position to a rollable configuration.

11. The method recited in claim 10, wherein the panels are traversed to the erected position by connecting adjacent panels with hook and loop fasteners, and during the pulling step, the hook and loop fasteners are detached to traverse the panels from the erected position to the rolling configuration.

12. The method recited in claim 10, wherein the placing step includes placing the transport tarp in the truck bed such that the loop segments are disposed adjacent the inner portion of the truck bed.

13. The method recited in claim 12, wherein the placing step includes placing respective ones of the peripheral panels over respective ones of a plurality of truck bed walls when the tarp body is in the open position.

14. The method recited in claim 10, wherein the pulling step causes the transport tarp to bend and invert as it is unloaded from the truck bed.

15. The method recited in claim 10, wherein the providing step includes providing a tarp body including first, second, third and fourth peripheral panels coupled to respective peripheral portions of the main panel.

* * * * *